March 28, 1944.   P. H. BRACE ET AL   2,345,091
ELECTROMAGNETIC TESTING MACHINE CHUCK
Filed May 3, 1941   2 Sheets-Sheet 1

WITNESSES:

INVENTORS
Porter H. Brace and
Clifton S. Williams.
BY
Paul E. Friedemann
ATTORNEY March 28, 1944. P. H. BRACE ET AL 2,345,091
ELECTROMAGNETIC TESTING MACHINE CHUCK
Filed May 3, 1941 2 Sheets-Sheet 2

WITNESSES:
C. J. Weller.
Rev. C. Groome

INVENTORS
Porter H. Brace and
Clifton S. Williams.
BY
Paul E. Friedemann
ATTORNEY Patented Mar. 28, 1944

2,345,091

UNITED STATES PATENT OFFICE 2,345,091

ELECTROMAGNETIC TESTING MACHINE CHUCK

Porter H. Brace and Clifton S. Williams, Forest Hills, Pa., assignors to Westinghouse Electric & Manufacturing Company, East Pittsburgh, Pa., a corporation of Pennsylvania Application May 3, 1941, Serial No. 391,646

2 Claims. (Cl. 279—2)

Our invention relates generally to electromagnetic testing but more particularly to an improved clutch, or chuck, particularly useful in any electromagnetic testing machine.

An example of a specific application we make of our improved chuck is in an electromagnetic testing machine such as is disclosed and claimed in our United States Letters Patent No. 2,221,570, issued November 12, 1940, and entitled Electromagnetic testing systems.

In the manufacture of steel parts, as well as other paramagnetic metal parts, there is frequent need for a rapid, and sensitive method for detecting flaws. Flaws may consist of cracks, voids (as, for example, shrinkage cavities), non-metallic inclusions and aggregations, irregularity of size and inhomogeneity due to local variations in the composition, constitution or structure of the metal, its mechanical history, thermal history or combinations of one or more of these.

In testing steel cones for roller bearings and other paramagnetic machine parts for cracks, non-metallic inclusions, grinding burns, and other defects detectable by the machine disclosed and claimed in our above-mentioned patent, the chucks for the machine, as these chucks were originally designed, were made of aluminum bronze which is generally regarded as being a non-magnetic material. We soon recognized that the test results with such aluminum bronze chucks, while yielding valuable results, were not always uniform when the same test-piece was subjected to successive tests.

Tests were then made to find out why a given test-piece, as a roller bearing cone, would not always yield the same test results. From these tests it was found that the bronze was, in fact, slightly magnetic and that the irregularities of the magnetization of the chucks were superposed on those due to the test-piece undergoing test so that when the test-piece was moved from chuck to chuck, or as its position on a given chuck changed, the resultant magnetic effect changed, giving rise to discordant test results.

Brass chucks were made and tested. These were less magnetic than the bronze but another effect then becomes evident, namely, that due to eddy currents set up in the low resistance brass chuck parts during demagnetization and polarization of the test-piece. (How this can be will be explained more in detail hereinafter.) The magnetic fields due to these eddy currents distorted the flux distribution in the test-piece and gave rise to erroneous test readings. The errors were less than those encountered with the aluminum bronze chucks but still sufficient to undesirably, to some extent, obscure the magnetic effect due to the test piece. This hiding, or obscuring, of the results wanted becomes progressive more marked as smaller and smaller magnetic irregularities are being studied, or the testing speed is increased or both.

One object of our invention is the provision of holding means for a test-piece being subjected to magnetic test that will assure correct indications of the magnetic characteristics of the test-piece.

Another object of our invention is the provision of holding means for test-pieces being subjected to magnetic tests which holding means produce no magnetic effect of their own.

A further object of our invention is the provision of uniform test results in a magnetic testing machine.

A somewhat more specific object of our invention is the provision of a resilient, non-metallic chuck of electric insulating material, for use in magnetic testing machines.

A further object of our invention is the provision of a non-magnetic non-conductive and wear-resistant chuck.

The objects hereinbefore expressed are merely illustrative and many other objects will, no doubt, become apparent from a study of the following specification when considered in conjunction with the accompanying drawings, in which.

Figure 1:
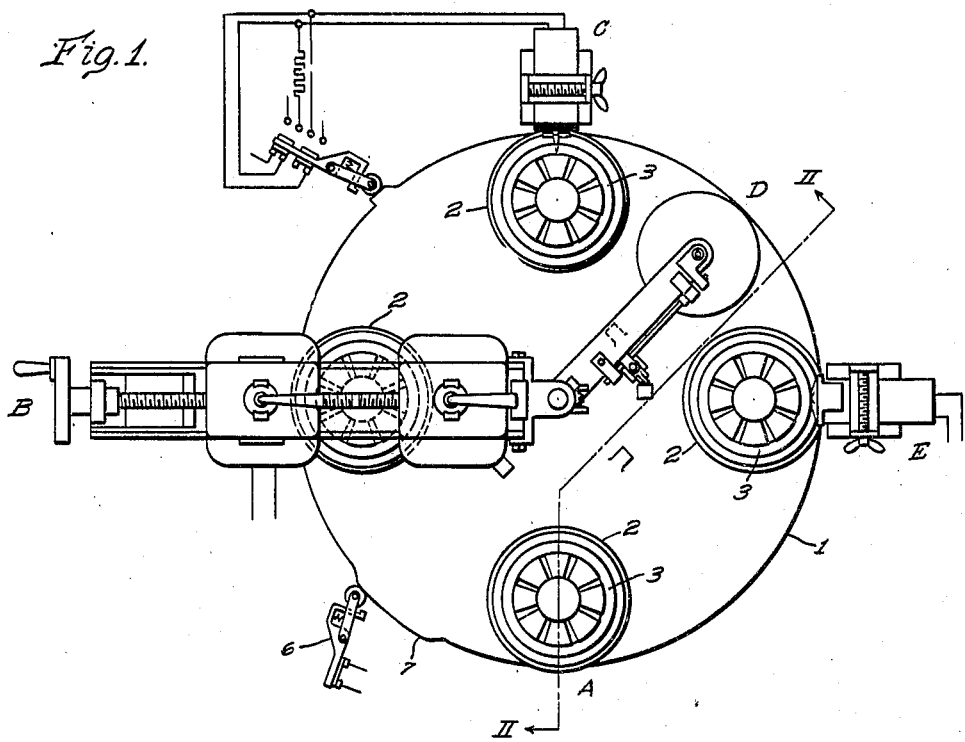
Figure 1 is a plan view of a machine for conducting magnetic tests, as it may actually be constructed and by means of which we practice our invention.

In Figure 1, the reference character 1 shows a plan view of a rotating table provided with four rotatable chucks, or clutches, 2 for receiving the test-pieces 3. The position A is the loading or test-piece positioning and test-piece removing position. Positions B, C, D and E correspond to the demagnetizing position, the polarizing position, the marking or printing position and the exploring or detecting position.

The table 1 is rotated either in successive steps or continuously in a clockwise direction by a suitable motor under the control of an attendant standing at position A. The motor is coupled to shaft 4, see Fig. 2.

Figure 2:
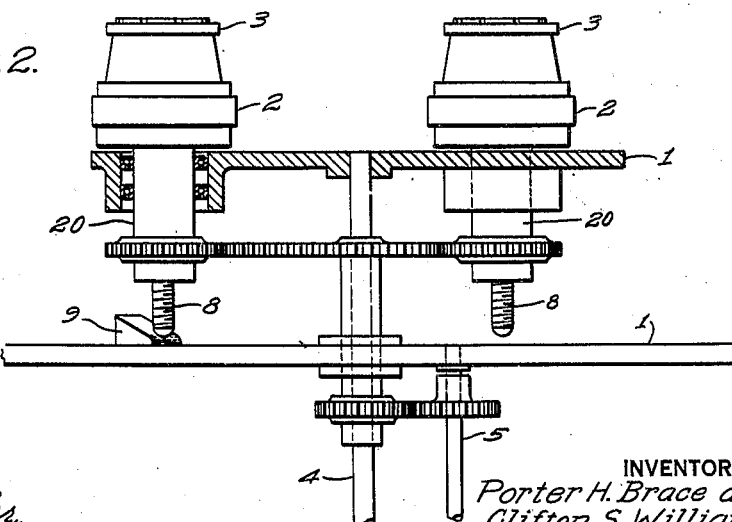
Fig. 2 is a side view of the showing in Fig. 1 with many parts omitted and some parts shown in section, the view being roughly along the section line II—II of Fig. 1.

The individual chucks are rotated about their vertical axes from shaft 5 through the transmission gears, shown in Fig. 2.

The sequence of operation is, very briefly stated, this: While switch 6 is engaged and thus closed by the cam 7 on table 1, the shaft 5 and thus the individual chucks are not rotating and the attendant at position A places a test-piece on the chuck. After a short clockwise travel the chuck firmly engages the test-piece to hold it and it begins to rotate. At position B, the test-piece is subjected to alternating magnetic changes to completely demagnetize it. The test-piece then arrives at position C to be remagnetized so as to have a given polarity at its surface. At position D, the test-piece is marked so that the test results may be correlated to positions on the piece and at position E the surface is scanned by an exploring magnetic detector or "pick-up" to measure the flux distribution in the test-piece.

Figure 3:
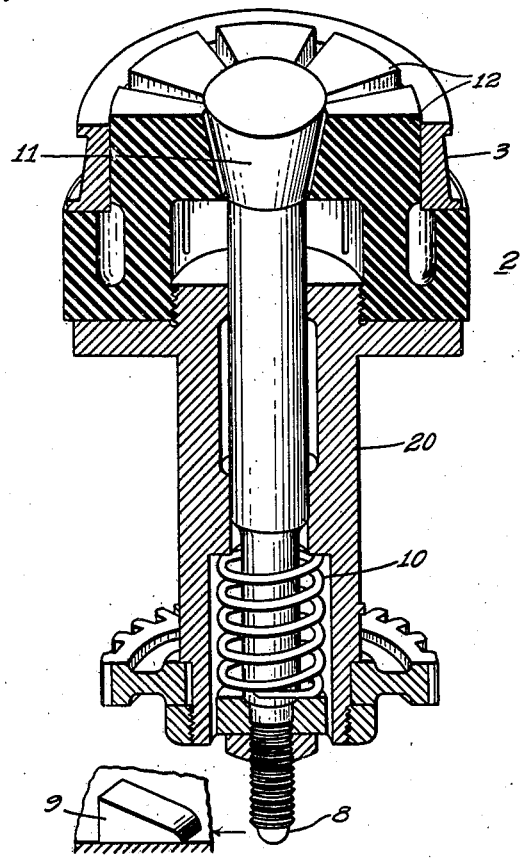
Fig. 3 is a view in vertical sectional perspective of our novel chuck as used in the machine shown in Fig. 1.

As the test-piece gets into position A, it stops rotating and the plunger 8 engages cam 9 and the plunger 8 is moved vertically upward against the action of the spring 10, Fig. 3, and the conical portion 11 releases the resilient chuck jaw portions 12 to thus release the test-piece 3.

The whole sequence is, of course, more or less a continuous operation, that is, tested test-pieces are removed at position A and untested ones are placed on the chucks as each of the four chucks moves to position A.

At position B, if low resistance brass chuck pieces are used, high eddy currents are induced in the chuck. Now, if heavy eddy currents are induced in the chuck at position B, the consequent magnetic effects in the test-piece, to some extent, still persist when the test-piece arrives at the exploring position E.

Since the eddy currents may be determined by time, temperature, resistivity and magnetizability of the chuck, the solution was found in the use of a material in which eddy currents could not exist. The eddy current problem may be disposed of by the use of non-conducting material. However, the mechanical serviceability then becomes dominant. Metal at first seemed the only answer. Experiment showed that unexpectedly favorable serviceability could be obtained from material sold under the trade-name of "Micarta." Another suitable material would be formed by the use of vinylidene chloride plastics either alone or in combination with fibrous fillers, with lubricating fillers such as graphite or molybdenum sulphide, or other types of fillers.

Real hard and tough rubber, or also other phenolic condensation products besides Micarta as well as suitable thermoplastics with mechanical properties similar to said Micarta may be used.

This type of chuck not only was found to eliminate all possibility of magnetization and eddy current effects, but a still further and unexpected advantage was discovered by reason of the greater flexibility and deformability of a chuck made of the type of insulating and non-magnetic material, over the resiliency and deformability of brass, aluminum bronze, bronze, steel or other metallic chuck materials.

It is found that a given chuck of the new material, in addition to its other desirable qualities, accommodates test-pieces whose diameters extend over a substantial range. Thus the number of chucks required to cover the size range of the test-pieces is greatly reduced.

Another advantage of our chuck is that test-pieces are not injured by our chuck. Test-pieces are often of a highly polished nature and, except for the magnetic test, ready for the market. Such test-pieces are often injured by chucks such as are provided by the prior art.

Figure 4:
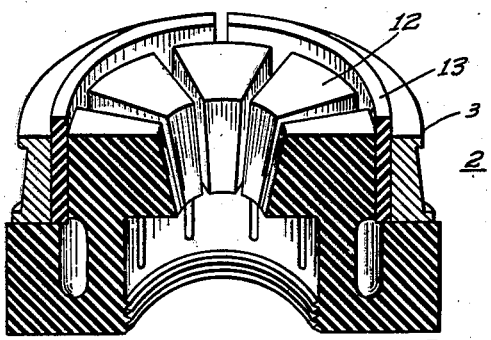
Fig. 4 is a view similar to Fig. 3 showing a modification of our invention.

The size range of test-pieces to which our chuck may be applied is still further increased by cutting the holding portion, as 12, into a plurality of segments as shown in Figs. 3 and 4. To still further increase the size range of test-pieces to which our chuck may be applied, we provide a split adapter or split sleeve 13. This sleeve is also constructed of material, such as is sold under the trade-name of Micarta, or Bakelite, or some other material having similar mechanical and electrical properties, as for instance the materials known generally as synthetic resins.

In the chuck, as shown in Fig. 3, 20 represents a rotatable spindle mounted in bearings as shown in Fig. 1. This spindle 20 is driven, as already broadly stated, from shaft 5. When the plunger or centering bar 8 is on cam 9, the upper conical, or cam, portion 11 permits radially inward movement of the jaw portions of the chuck 2 to release the test-piece. After a new, or untested, test-piece is put on the jaws and the plunger 8 moves off the cam 9, the spring drives the plunger down and the conical portion forces the jaws radially outward to engage the test-piece to hold it firmly in relation to the spindle 20.

With the modification shown in Fig. 4, the function is the same except the adapter 13 is used.

The specific showings hereinbefore made are illustrative of our invention and are not to be construed in a limiting sense. Other specific constructions and other materials having the physical characteristics of the chuck we disclose will, we believe, suggest themselves to those skilled in the art after having had the benefit of our teachings. We, therefore, wish to be limited only by the scope of the claims hereto appended.

We claim as our invention:

1. A rotary chuck for accommodating a magnetizable specimen in an electromagnetic testing machine, comprising in combination, a rotatable spindle, a chuck body of elastically deformable, electrically insulating, non-magnetic material having a base portion firmly mounted on said spindle and resiliently movable jaws integral with said portion for clamping the specimen to be tested, and an actuating member for moving said jaws relative to said portion in order to engage and disengage the specimen, said jaws having clamping surfaces spaced from said spindle and actuating member, and said chuck body being arranged so as to separate the specimen electrically and magnetically from said spindle and member.

2. A rotary chuck for accommodating a magnetizable specimen in an electromagnetic testing machine, comprising, in combination, a spindle, a chuck body of elastically deformable electrically, insulating, non-magnetic material having a base portion firmly mounted on said spindle and resiliently movable jaws for clamping the specimen to be tested, an actuating member coaxial with said spindle and axially displaceable thereto, said jaws being integral with said portion and having clamping surfaces spaced from said spindle and actuating member and having also a conical surface portion, said actuating member having a conical portion engaging said conical surface portions of said jaws for causing said jaws to engage and disengage the specimen dependent upon the axial position of said member, a spring for biasing said member toward one axial position, and means for moving said member against the spring bias toward another axial position, said chuck body being arranged so as to electrically and magnetically separate the specimen from said spindle, member and spring.

PORTER H. BRACE.
CLIFTON S. WILLIAMS.